United States Patent [19]

Madan et al.

[11] Patent Number: 4,618,445

[45] Date of Patent: Oct. 21, 1986

[54] PEROXIDE BLEACH AND COMPOSITIONS COMPRISING SAID BLEACH

[75] Inventors: Gulzari L. Madan, Andheri; Bookinkere C. S. Rao, Mysore, both of India

[73] Assignee: Lever Brothers Company, New York, N.Y.

[21] Appl. No.: 612,504

[22] Filed: May 21, 1984

[30] Foreign Application Priority Data

May 20, 1983 [GB] United Kingdom ............... 8313941

[51] Int. Cl.$^4$ ................. C11D 7/18; C11D 7/56
[52] U.S. Cl. ..................... 252/99; 252/103; 252/186.28
[58] Field of Search ............ 252/99, 103, 186.28

[56] References Cited

U.S. PATENT DOCUMENTS

| | | | |
|---|---|---|---|
| 3,294,686 | 12/1966 | Ayers | 106/307 |
| 3,979,312 | 9/1976 | Nakagawa et al. | 252/99 |
| 3,979,313 | 9/1976 | Nakagawa et al. | 252/99 |
| 4,005,182 | 1/1977 | Ito et al. | 423/467 |
| 4,146,571 | 3/1979 | Will et al. | 423/415 |
| 4,323,465 | 4/1982 | Downey et al. | 252/102 |

*Primary Examiner*—Amelia B. Yarbrough
*Attorney, Agent, or Firm*—Milton L. Honig; James J. Farrell

[57] ABSTRACT

A cost-effective peroxide bleach having improved alkaline stability is obtained by forming an adduct of sodium sulphate, hydrogen peroxide, sodium chloride and an alkali metal phosphate, which is belived to be a mixed crystal having the formula:

$$4Na_2SO_4 \cdot 2H_2O_2 \cdot NaCl \, (xM_2O \cdot yP_2O_5)_n,$$

wherein M is alkalimetal; x is from 1 to 3; y is from 0.5 to 2; and n is from 0.1 to 1.

The hydrogen peroxide adduct is suitable for use as a bleach in alkaline detergent compositions in countries with climates where high temperature and high humidity prevail.

5 Claims, No Drawings

PEROXIDE BLEACH AND COMPOSITIONS COMPRISING SAID BLEACH

This invention relates to peroxide bleaches. The peroxide bleach of the invention is a hydrogen peroxide adduct having improved storage stability.

The storage stability of hydrogen peroxide adducts is a key problem area, particularly under conditions involving alkaline detergent compositions, high humidity and high temperature. To date, only two hydrogen peroxide adducts have emerged as serious commercial prospects for use as a bleach in alkaline detergent compositions, which form a major proportion of all detergent compositions on the market.

(i) Sodium perborate is now widely established as the most stable peroxide bleach in detergent compositions, but is still unsatisfactory for use under really extreme climatic conditions of humidity and temperature.

(ii) Sodium percarbonate is much less stable under adverse conditions and is totally unsuitable for use under really extreme conditions of humidity and temperature.

Hence, the limitation imposed on the use of the above hydrogen peroxide adducts is that they are unsuitable for use in climates where high humidity and high temperature prevail.

It is known that a sodium sulphate-hydrogen peroxide-sodium chloride adduct of the formula $$4Na_2SO_4 \cdot 2H_2O_2 \cdot NaCl,$$

as disclosed in U.S. Pat. Nos. 3,979,312 and 4,005,182 and German Patent Application No. 2,530,539, is more stable under high humidity and high temperature conditions.

Still, a disadvantage of this adduct is that it can only be stably incorporated in light duty detergent compositions having a pH near neutral, i.e. having a solution pH of 6-8.

Since the majority of detergent compositions are alkaline heavy duty detergent compositions and have a solution PH above 8, i.e. generally between 9 and 13, preferably between 9.5 and 12, the sodium sulphate-hydrogen peroxide-sodium chloride adduct of the art is unsuitable for use in such compositions.

It has been proposed in U.S. Pat. No. 4,323,465 to incorporate very expensive organic polyphosphonate materials, i.e. "Dequests" ® ex Monsanto, in the crystalline structure of $4Na_2SO_4 \cdot 2H_2O_2 \cdot NaCl$ for improving its alkaline stability.

It is an object of the present invention to provide an improved and more cost-effective peroxide bleach which can be stably incorporated in alkaline detergent compositions under high humidity and high temperature climatic conditions.

It has now been found that the above object can be achieved by an adduct of sodium sulphate, hydrogen peroxide, sodium chloride and an alkali metal phosphate.

Alkali metal phosphates usable in the adduct of the invention are, for example, condensed phosphates such as sodium or potassium triphosphate, sodium or potassium pyrophosphate, sodium or potassium hexametaphosphate, and sodium or potassium orthophosphate.

Preferred alkali metal phosphates are condensed phosphates, particularly sodium hexametaphosphate and sodium triphosphate.

The adduct of the invention is believed to be a mixed crystal having the formula $$4Na_2SO_4 \cdot 2H_2O_2 \cdot NaCl(xM_2 \cdot yP_2O_5)_n$$

wherein M is alkali metal, x is a number from 1-3, y is from 0.5 to 2 and n is from 0.1 to 1.

Accordingly, the following mixed crystals are for example within the scope of this invention:

$$4Na_2SO_4 \cdot 2H_2O_2 \cdot NaCl(Na_5P_3O_{10})$$

$$4Na_2SO_4 \cdot 2H_2O_2 \cdot NaCl(Na_4P_2O_7)$$

$$4Na_2SO_4 \cdot 2H_2O_2 \cdot NaCl(Na_3PO_4)$$

$$4Na_2SO_4 \cdot 2H_2O_2 \cdot NaCl(Na_2P_2O_6)$$

The hydrogen peroxide adduct of the invention can be prepared by forming a saturated solution of sodium sulphate in aqueous hydrogen peroxide solution at a temperature ranging from 5°-45° C., and adding thereto 5-20% by weight of sodium chloride and 5-10% by weight of an alkali metal phosphate based on the saturated solution, at a temperature between 5° and 45° C., by which there is formed a white crystalline product which can be separated from the liquor, e.g. by filtration, and dried.

Preferably an alkaline hydrogen peroxide solution is used, which was found to result in a still more stable adduct.

A further improvement of the stability can be achieved if the adduct is coated or dusted with aluminium stearate before the final drying step.

The hydrogen peroxide adduct of the invention can be suitably used as an alkaline bleach for e.g. textiles and other materials, or as a bleaching agent incorporated in any detergent composition including alkaline detergent compositions having a solution pH above 8.

It can be used alone or in combination with a bleach catalyst or bleach activator such as those of the types well known in the art, e.g. heavy metal catalysts or organic types of activators which are capable of reacting with hydrogen peroxide in aqueous solution forming organic peracids.

When incorporated in alkaline detergent compositions, the amount of adduct may be from 3 to about 95% by weight, preferably from 10 to 45% by weight of the composition.

The alkaline detergent composition comprising the adduct of the invention may contain the components customarily used in detergent compositions for e.g. fabric washing or hard-surface cleaning, such as, for example, anionic, cationic, zwitterionic and/or nonionic surfactants in an amount generally of from 3 to 50% by weight, inorganic or organic builders and alkaline substances in amounts generally of from 5 to 80% by weight. Other components or adjuncts commonly used in detergent compositions in minor amounts are, for example, soil-suspending and anti-redeposition agents such as the water-soluble salts of carboxymethylcellulose, carboxyhydroxymethylcellulose, homo- or copolymers of polycarboxylic acid or salts thereof such as the copolymers of maleic anhydride and methyl vinyl ether; perfumes, dyes and pigments; optical brighteners; enzymes; anti-caking agents, suds-control agents; germicides; fillers etc. Bleach catalysts and/or bleach activators may also be incorporated.

Accordingly, in another aspect of the invention a detergent composition is provided comprising 3–95% of an adduct of sodium sulphate-hydrogen peroxide-sodium chloride and an alkali metal phosphate as hereinbefore defined, which is stable under high humidity and high temperature conditions.

EXAMPLE I

A sodium sulphate-hydrogen peroxide-sodium chloride-sodium hexametaphosphate adduct was prepared in the following manner:

570 g anhydrous sodium sulphate was mixed with 300 ml of a 50% (w/v) hydrogen peroxide solution. The mixture was stirred for two hours while the temperature of the system was maintained below 40° C. This was followed by vacuum filtration. The filter cake was mixed with 100 ml of 10% (w/v) hydrogen peroxide solution prepared by diluting the required amount of filtrate. To this slurry 96 g of dry sodium chloride was added slowly with stirring, the temperature being kept in the range of 30°–40° C., and the mixture was again vacuum filtered. The filter cake was mixed with a minimum quantity of the filtrate required for stirring and to this 80 g of sodium hexametaphosphate (10% of the complex) was gradually added. At the end of two hours of stirring, the adduct was filtered and dried in an air blower.

The storage behaviour of this adduct (A) incorporated in a conventional alkaline heavy duty detergent composition was compared with a sodium sulphate-hydrogen peroxide-sodium chloride adduct ($4Na_2SO_4.2H_2O_2.NaCl$) of the art (B) prepared in the above manner but without the addition of sodium hexametaphosphate.

20 parts of the adduct were dry mixed with 80 parts of a conventional alkaline detergent composition* and stored in sachets under hot/humid conditions (40° C./95% RH).

The results were as follows.

TABLE 1

| | % $H_2O_2$ remaining after storage in weeks | | |
|---|---|---|---|
| | 1 | 3 | 7 |
| A | 95 | 85 | 82 |
| B | 4 | 4 | 4 |

The improved storage stability of adduct (A) of the invention in an alkaline detergent composition under hot/humid conditions is clearly evident.

Similar good results were obtained when adducts were used in which the hexametaphosphate was replaced by sodium or potassium triphosphate at the same 10% level of the complex.

| *Alkaline detergent composition | % by weight |
|---|---|
| Sodium alkyl benzene sulphonate | 20.0 |
| Sodium tripolyphosphate | 23.0 |
| Sodium carbonate, anhydrous | 15.0 |
| Alkaline sodium silicate | 14.0 |
| Borax | 2.6 |
| Sodium carboxymethylcellulose | 2.0 |
| Sodium sulphate | 14.0 |
| Dye, optical bleach, perfume | 0.7 |
| Water | 8.7 |

EXAMPLES II–III

Two samples of sodium sulphate-hydrogen peroxide-sodium chloride-sodium hexametaphosphate adduct were prepared.

(II) 570 g anhydrous sodium sulphate was mixed with 300 ml hydrogen peroxide (50% w./v). The mixture was stirred for two hours, the temperature of the system being maintained below 40° C. This was followed by vacuum filtration. The filter cake was mixed with 100 ml of 10% (w/v) hydrogen peroxide solution prepared by diluting the required amount of filtrate. To this slurry 96 g dry sodium chloride was added slowly with stirring. It was stirred for two hours, the temperature being kept in the range 30°–40° C., and again vacuum filtered. The filter cake was mixed with a minimum quantity of the filtrate required for stirring and to this 80 g of SHMP* (10% of the complex) was gradually added. At the end of two hours of stirring, the adduct was filtered and dry mixed with 40 g aluminium stearate (5% of the complex). Further drying of the adduct was done in an air blower.

* SHMP = sodium hexametaphosphate (III) 570 g of previously dried anhydrous sodium sulphate was mixed with 360 ml of 30% hydrogen peroxide and 0.72 g of sodium hydroxide for 2 hours, using a mechanical stirrer at temperatures below 30° C. (To avoid all metal contacts, a glass stirrer and polythene beakers were used.) This was filtered under vacuum. 80 g of previously dried sodium chloride was mixed with the complex and 80 ml filtrate added (minimum amount necessary to facilitate mixing with mechanical stirrer). This was stirred for 2 hours at a temperature below 30° C. This adduct was then partially filtered and mixed with sodium hexametaphosphate for 2 hours. After filtration, the complex was dusted with aluminium stearate and dried in an air blower at room temperature for 16–18 hours.

20 parts of these adducts were dry-mixed with 80 parts of a conventional alkaline detergent composition of Example I and stored in sachets under hot/humid conditions (40° C./95% RH). The results were as follows:

TABLE II

| Hydrogen peroxide decomposition after storage for 9 weeks | |
|---|---|
| Sample II | 33% |
| Sample III | 14% |

These examples show that the hydrogen peroxide adducts of the invention are of satisfactory stability for incorporation as a bleach in alkaline detergent compositions for sale in countries with climates where high humidity and high temperature prevail.

We claim:

1. A peroxide bleach comprising an adduct which is a mixed crystal having the formula:

$4Na_2SO_4.2H_2O_2.NaCl\ (xM_2O.yP_2O_5)_n$, wherein M is alkalimetal; x is a number from 1 to 3; y is a number from 0.5 to 2; and n is from 0.1 to 1.

2. A peroxide bleach according to claim 1, wherein said adduct is derived from an alkalimetal phosphate selected from the group consisting of sodium hexametaphosphate, sodium triphosphate, sodium pyrophosphate and sodium orthophosphate.

3. An alkaline detergent composition comprising from 3% to about 95% by weight of the peroxide bleach of claim 2, 0-50% by weight of a surfactant selected from the group consisting of anionic, cationic, zwitterionic, nonionic surfactants or mixtures thereof; and 0-80% by weight of an inorganic or organic builder.

4. An alkaline detergent composition according to claim 3, comprising:

(a) from 10 to 45% by weight of said peroxide bleach;
(b) from 3 to 50% by weight of said surfactant selected from the group consisting of anionic, cationic, zwitterionic, nonionic surfactants or mixtures thereof; and
(c) from 5 to 80% by weight of said builder.

5. A peroxide bleach according to claim 1 wherein the adduct is coated with aluminum stearate.

* * * * *